(12) United States Patent
Durel et al.

(10) Patent No.: US 7,491,767 B2
(45) Date of Patent: *Feb. 17, 2009

(54) TIRE TREAD REINFORCED WITH A SILICA OF VERY LOW SPECIFIC SURFACE AREA

(75) Inventors: Olivier Durel, Clermont-Ferrand (FR); Roland Rauline, Durtol (FR)

(73) Assignee: Michelin Recherche Et Technique S.A., Granges-Paccott (CH)

( * ) Notice: Subject to any disclaimer, the term of this patent is extended or adjusted under 35 U.S.C. 154(b) by 128 days.

This patent is subject to a terminal disclaimer.

(21) Appl. No.: 10/745,480

(22) Filed: Dec. 29, 2003

(65) Prior Publication Data

US 2005/0016650 A1    Jan. 27, 2005

Related U.S. Application Data

(63) Continuation of application No. PCT/EP02/06886, filed on Jun. 21, 2002.

(30) Foreign Application Priority Data

Jun. 28, 2001    (FR) .................................... 01 08785

(51) Int. Cl.
  C08K 3/34    (2006.01)
  C08K 3/04    (2006.01)
  B60C 11/00    (2006.01)
(52) U.S. Cl. .................. 524/493; 524/495; 152/209.1
(58) Field of Classification Search .................. 524/493
  See application file for complete search history.

(56) References Cited

U.S. PATENT DOCUMENTS

| 3,622,650 | A | * | 11/1971 | Berstein et al. ............. 524/493 |
| 3,842,111 | A |   | 10/1974 | Meyer-Simon et al. |
| 3,873,489 | A |   | 3/1975 | Thurn et al. |
| 3,978,103 | A |   | 8/1976 | Meyer-Simon et al. |
| 3,997,581 | A |   | 12/1976 | Pletka et al. |
| 4,002,594 | A |   | 1/1977 | Fetterman |
| 4,072,701 | A |   | 2/1978 | Pletka et al. |
| 4,129,585 | A |   | 12/1978 | Buder et al. |
| 5,580,919 | A |   | 12/1996 | Agostini et al. |
| 5,583,245 | A |   | 12/1996 | Parker et al. |
| 5,650,457 | A |   | 7/1997 | Scholl et al. |
| 5,663,358 | A |   | 9/1997 | Cohen et al. |
| 5,663,395 | A |   | 9/1997 | Gobel et al. |
| 5,663,396 | A |   | 9/1997 | Musleve et al. |
| 5,674,932 | A |   | 10/1997 | Agostini et al. |
| 5,675,014 | A |   | 10/1997 | Cohen et al. |
| 5,684,171 | A |   | 11/1997 | Wideman et al. |
| 5,684,172 | A |   | 11/1997 | Wideman et al. |
| 5,696,197 | A |   | 12/1997 | Smith et al. |
| 5,708,053 | A |   | 1/1998 | Jalics et al. |
| 5,882,617 | A |   | 3/1999 | Chevallier et al. |
| 5,892,085 | A |   | 4/1999 | Munzenberg et al. |
| 5,925,713 | A | * | 7/1999 | Labauze ...................... 524/572 |
| 5,958,127 | A | * | 9/1999 | Bomal et al. ................. 106/492 |
| 6,001,322 | A | * | 12/1999 | Chevallier et al. ........... 423/339 |
| 6,169,137 | B1 |   | 1/2001 | Vasseur |
| 6,610,261 | B1 | * | 8/2003 | Custodero et al. ........... 423/127 |
| 2005/0004297 | A1 | * | 1/2005 | Durel et al. .................. 524/493 |

FOREIGN PATENT DOCUMENTS

| EP | 0 157 703 | 10/1985 |
| EP | 0 396 450 | 11/1990 |
| EP | 0 501 227 | 2/1991 |
| EP | 0 692 492 | 1/1996 |
| EP | 0 692 493 | 1/1996 |
| EP | 0 722 977 | 7/1996 |
| EP | 0 735 088 | 10/1996 |
| EP | 0 767 206 | 4/1997 |
| EP | 0 786 493 | 7/1997 |
| EP | 0 881 252 | 12/1998 |
| EP | 1 043 357 | 10/2000 |
| FR | 2 149 339 | 3/1973 |
| FR | 2 206 330 | 6/1974 |
| GB | 1 439 247 | 6/1976 |
| WO | WO 99/02590 | 1/1999 |
| WO | WO 99/02601 | 1/1999 |
| WO | WO 99/02602 | 1/1999 |
| WO | WO 99/06480 | 2/1999 |
| WO | WO 99/28376 | 6/1999 |
| WO | WO 00/05300 | 2/2000 |
| WO | WO 00/05301 | 2/2000 |

\* cited by examiner

*Primary Examiner*—Tae H Yoon
(74) *Attorney, Agent, or Firm*—Buchanan Ingersoll & Rooney PC

(57) ABSTRACT

A tire tread incorporating an elastomeric composition reinforced with silica, based on at least (phr=parts by weight per hundred parts of diene elastomer):

(i) a diene elastomer;
  (ii) as reinforcing filler, more than 80 phr of an inorganic filler constituted in its entirety or in part by a silica (referred to as LS) having the following characteristics:
    (a) a BET specific surface area of between 50 and 100 m$^2$/g;
    (b) an average particle size, $d_w$, of between 50 and 350 nm;
  (iii) a coupling agent providing the bond between the reinforcing inorganic filler and the diene elastomer;
  (iv) a vulcanization system based on sulfur.

Preferably, this LS silica furthermore has a disagglomeration rate α greater than $5\times10^{-3}$ $\mu m^{-1}$/min (measured in the ultrasound disagglomeration test). Compared with a conventional tread for "Green Tires" reinforced with a silica of higher specific surface area, the tread of the invention has an improved compromise of performances in terms of wear resistance, rolling resistance, grip and drift thrust.

18 Claims, 1 Drawing Sheet

TIRE TREAD REINFORCED WITH A SILICA OF VERY LOW SPECIFIC SURFACE AREA

This application is a continuation of international PCT application Serial No. PCT/EP02/06886, filed Jun. 21, 2002, which was published in English as WO 03/002649 A1 on Jan. 9, 2003, and which is incorporated by reference.

The present invention relates to tire treads, more particularly to treads reinforced with an inorganic filler, in particular silica, and to tires comprising such treads.

It is known that tire treads must conform to numerous technical demands, which are frequently contradictory, first and foremost have a high wear or abrasion resistance and excellent grip while imparting to the tire a very good level of road behavior ("handling") on the automobile, which requires in particular a high drift thrust (or "cornering").

In order to obtain the optimum reinforcement properties imparted by a filler in a tire tread and thus high wear resistance, it is known that this filler should generally be present in the elastomeric matrix in a final form which is both as finely divided as possible and distributed as homogeneously as possible. Now, such conditions can only be obtained insofar as this filler has a very good ability firstly to be incorporated into the matrix during mixing with the elastomer and to be disagglomerated, and secondly to be dispersed homogeneously in this matrix.

It is known that carbon black has such abilities, which is generally not true of inorganic fillers, in particular silicas, because, for reasons of mutual attraction, these inorganic filler particles have an irritating tendency to agglomerate together within the elastomeric matrix. The harmful consequence of these interactions is to limit the dispersion of the filler and hence the reinforcing properties to a substantially lower level than that which it would be theoretically possible to achieve if all the (inorganic filler/elastomer) bonds that could be created during the mixing operation were in fact obtained; these interactions furthermore tend to increase the consistency of the rubber compositions in the uncured state and therefore to make them more difficult to work ("processability") than in the presence of carbon black.

Since fuel economies and the need to protect the environment have become priorities, it has however proved necessary to produce tires having reduced rolling resistance, without adversely affecting their wear resistance.

This has been made possible in particular due to the use, in treads for these tires, of new rubber compositions reinforced with inorganic fillers, in particular specific silicas of the highly dispersible type, which are capable of rivaling a conventional tire-grade carbon black from the reinforcing point of view, while offering these compositions a lower hysteresis, which is synonymous with lower rolling resistance for the tires comprising them, and also improved grip on wet, snow-covered or icy ground.

Treads filled with such highly dispersible silicas, usable in tires having low rolling resistance which are sometimes referred to as "Green Tires" because of the energy saving offered to the user ("Green Tire concept"), have been described in large numbers. Reference will be made in particular to patent applications EP 501 227, EP 692 492, EP 692 493, EP 735 088, EP 767 206, EP 786 493, EP 881 252, WO99/02590, WO99/02601, WO99/02602, WO99/06480, WO00/005300 and WO00/05301.

All these documents of the prior art teach the necessity, in order to obtain a sufficient wear resistance, of using silicas which not only are sufficiently dispersible but also have a high BET specific surface area, of between 100 and 250 m²/g, in fact typically greater than 150 m²/g (see in particular the aforementioned application EP 501 227). One silica of high specific surface area forming a reference in the field of "Green Tires" is in particular the silica "Zeosil 1165 MP" (BET surface area equal to approximately 160 m²/g) sold by Rhodia (see aforementioned documents).

Although the use of these specific silicas of high specific surface area as reinforcing fillers has reduced the difficulties of processing the rubber compositions that contain them, they are still tricky to process, more difficult than for rubber compositions filled conventionally with carbon black.

It is first of all necessary to use a coupling agent, also referred to as bonding agent, the function of which is to provide the connection or bond between the surface of the particles (silanol groups Si—OH) of silica and elastomer, while facilitating the dispersion of this filler within the elastomeric matrix, the high specific surface area advocated for these silicas being intended precisely to increase the number and quality of the bonds between the silica and the coupling agent, in order to achieve the high level of reinforcement expected.

Such coupling agents are well-known to the person skilled in the art, essentially organosilanes or polyfunctional polysiloxanes. The best known are polysulfurised alkoxysilanes, in particular bis-(alkoxylsilylalkyl) polysulfides such as bis-(alkoxylsilylpropyl) polysulfides, very particularly bis 3-triethoxysilylpropyl tetrasulfide and disulfide (abbreviated to TESPT and TESPD, respectively), which are generally considered as the products providing, for treads filled with silica, the best compromise in terms of resistance to scorching, ease of processing and reinforcing ability. As such, they are the coupling agents which are most used nowadays in "Green Tires".

These polysulfurised alkoxysilanes do however have the known disadvantage that they are very costly and what is more need to be used in a relatively large quantity, typically of the order of 8 to 12% by weight relative to the weight of silica, which is equivalent to amounts of generally between 5 and 10 phr (phr=parts by weight per hundred parts of diene elastomer). In order to reduce these amounts of alkoxysilanes, coupling activators in particular have been proposed (see aforementioned applications WO00/05300 and WO00/05301).

Another factor adversely affecting the processing of the rubber compositions in the uncured state, compared with the use of carbon black, is linked to the strong physical-chemical interactions which are capable of being established between these reinforcing silicas, owing to their large reactive surface, and other ingredients of the rubber compositions, in particular with the vulcanization system. This drawback is the cause of a loss of yield and a reduction in the vulcanization kinetics. In order to counteract these parasitic effects, the amounts of vulcanization agents, in particular accelerators, have had to be increased, other types of accelerators (secondary accelerators) added, relative to the conventional formulations based on carbon black.

In summary, although treads filled with dispersible silicas of high specific surface area have made it possible to achieve a compromise of properties, in terms of rolling resistance, wear resistance and grip, which cannot be obtained with a conventional carbon black for tires, such a result could only be obtained at the cost of more difficult processing and supplementary industrial costs linked in particular to the use of relatively large quantities of coupling agents, in particular polysulfurised alkoxysilanes, and an increase in the amounts of vulcanization agents.

Now, the Applicant discovered during its research that another category of silicas may not only lead to an excellent compromise of performances for the tire treads containing them, which is even greater overall than that offered by silicas of high specific surface area, but also makes it possible to overcome, at least in part, the aforementioned drawbacks caused by the silicas of high specific surface area used in the treads of "Green Tires".

Consequently, a first subject of the invention relates to a tread incorporating an elastomeric composition reinforced with an inorganic filler, based on at least (phr=parts by weight per hundred parts of diene elastomer):

(i) a diene elastomer;
(ii) as reinforcing filler, more than 80 phr of an inorganic filler constituted in its entirety or in part by a silica having the following characteristics (hereafter "LS" silica):
  (a) a BET specific surface area of between 50 and 100 $m^2/g$;
  (b) an average particle size $d_w$ of between 50 and 350 nm;
(iii) a coupling agent providing the bond between the reinforcing inorganic filler and the diene elastomer;
(iv) a vulcanization system based on sulfur.

Such silicas referred to as "LS" (for "Low Surface") are known and have been able to be used, as fillers or adhesion-promoting additives, in some parts of tires, essentially in internal mixes based on natural rubber intended in particular for calendaring tire crown or carcass reinforcement plies. However, to the knowledge of the Applicants, no document of the prior art describes, and certainly does not give examples of, the use of such LS silicas, sometimes referred to as "coarse" owing to their very low specific surface area and having a reinforcing ability which is consequently judged insufficient, in tire treads.

One subject of the invention is also the use as reinforcing filler, in a tire tread, of an LS silica having the aforementioned characteristics a and b.

One subject of the invention is also the use of a tread according to the invention for the manufacture or the recapping of tires, and also these tires themselves when they comprise a tread according to the invention. The tires of the invention are particularly intended to be fitted on vehicles capable of travelling at a sustained high speed such as passenger vehicles, 4×4 vehicles (having 4 driving wheels), SUVs ("Sport Utility Vehicles"), two-wheeled vehicles (in particular motorcycles), vans, "heavy vehicles" (in particular subway trains, buses and road transport machinery such as lorries, tractors or trailers).

The treads according to the invention are capable of being prepared by a process which constitutes another subject of the present invention. This process for preparing a sulfur-vulcanizable tire tread, having an improved compromise of performances (wear resistance/rolling resistance/grip/drift thrust), based on diene elastomer, a reinforcing inorganic filler and a vulcanization system, comprises the following steps:

incorporating in a diene elastomer, during a first step referred to as "non-productive", at least:
  as reinforcing filler, more than 80 phr of an inorganic filler constituted in its entirety or in part by a silica having the following characteristics ("LS" silica):
    (a) a BET specific surface area of between 50 and 100 $m^2/g$;
    (b) an average particle size $d_w$ of between 50 and 350 nm;
  and a coupling agent providing the bond between the silica and the diene elastomer;

thermomechanically kneading the entire mixture, in one or more stages, until a maximum temperature of between 110° C. and 190° C. is reached;
cooling the entire mixture to a temperature of less than 100° C.;
then incorporating, during a second step referred to as "productive", sulfur and a primary vulcanization accelerator;
kneading the entire mixture until a maximum temperature less than 110° C. is reached;
calendaring or extruding the elastomeric composition thus obtained in the form of a tire tread.

According to a preferred embodiment of the invention, the LS silica constitutes the majority, more preferably still the entire, reinforcing inorganic filler. The invention thus makes it possible substantially to reduce the amounts of vulcanization agents, sulfur and vulcanization accelerators.

Another particularly preferred embodiment consists of using, as vulcanization activator, a substantially reduced amount, namely between 0.5 and 1.5 phr only, of zinc, supplied in particular in the form of zinc oxide or zinc stearate. It has in fact been noted that the use of LS silicas had the drawback of substantially increasing the induction delays during the vulcanization (time necessary at the start of the vulcanization reaction) and that, unexpectedly, this drawback could be overcome by a reduction in the usual amount of zinc.

BRIEF DESCRIPTION OF THE DRAWINGS

The invention and its advantages will be readily understood in the light of the description and examples of embodiment which follow, and of the single FIGURE relating to these examples, which shows curves of the variation of modulus (in MPa) as a function of the elongation (in %), recorded for rubber compositions intended for tire treads, whether or not in accordance with the invention.

DETAILED DESCRIPTION

I. Measurements and Test Used

I-1. Characterization of the Silicas

The silicas described hereafter consist in known manner of agglomerates of particles, which are capable of disagglomerating into these particles under the effect of an external force, for example under the action of mechanical working or ultrasound. The term "particle" used in the present application must be understood in its usual generic sense of "aggregate" (also referred to as "secondary particle"), and not in that of a possible elementary particle (also referred to as "primary particle") which may form, if applicable, part of this aggregate; "aggregate" is to be understood, in known manner, to mean the non-splittable unit (i.e. which cannot be cut or divided) generally formed of elementary (primary) particles which are aggregated together, produced during synthesis of the filler.

These silicas are characterized as indicated hereafter.

A) Specific Surface Area:

The BET specific surface area is determined by adsorption of gas using the method of Brunauer-Emmett-Teller described in "*The Journal of the American Chemical Society*" (Vol. 60, page 309, February 1938), more precisely in accordance with French Standard NF ISO 9277 of December 1996 [multipoint volumetric method (5 points)—gas: nitrogen—degassing: 1 hour at 160° C.—range of relative pressure p/po: 0.05 to 0.17].

The CTAB specific surface area is the external surface area determined in accordance with French Standard NF T 45-007 of November 1987 (method B).

B) Average Particle Size $d_w$:

The average size (by mass) of the particles, $d_w$, is measured conventionally after dispersion, by ultrasound disagglomeration, of the filler to be analyzed in water.

Measurement takes place using a centrifugal X-ray detection sedimentometer type "XDC" ("X-rays Disk Centrifuge"), sold by Brookhaven Instruments, in accordance with the following method of operation.

A suspension of 3.2 g of a sample of silica to be analyzed in 40 ml of water is produced by action over 8 minutes at 60% power (60% of the maximum position of the "output control") of a 1500-watt ultrasonic probe (Vibracell ¾ inch ultrasound generator sold by Bioblock); after ultrasound generation, 15 ml of the suspension is introduced into the rotating disc; after sedimentation for 120 minutes, the mass distribution of the particle sizes and the average size by mass of the particles $d_w$ are calculated by the software of the "XDC" sedimentometer ($d_w = \Sigma(n_i d_i^5)/\Sigma(n_i d_i^4)$ with $n_i$ being the number of objects of the size class or diameter $d_i$).

c) Disagglomeration Rate α:

The disagglomeration rate α is measured by means of an ultrasound disagglomeration test, at 100% power of a 600 W (watt) probe, operating here in pulse mode (namely: 1 second ON, 1 second OFF) in order to avoid excessive heating of the ultrasonic probe during the measurement. This known test, which is the subject in particular of patent application WO99/28376 (see also WO99/28380, WO00/73372, WO00/73373), makes it possible to measure continuously the change in the average size (by volume) of the agglomerates of particles during ultrasound generation, in accordance with the specifications hereafter.

The setup used is formed of a laser granulometer (type "Mastersizer S", sold by Malvern Instruments—He—Ne red laser source, wavelength 632.8 nm) and its preparer ("Malvern Small Sample Unit MSX1"), between which there has been inserted a continuous-flow treatment cell (Bioblock M72410) provided with an ultrasonic probe (600-watt ½ inch ultrasound generator type Vibracell sold by Bioblock).

A small quantity (150 mg) of silica to be analyzed is introduced into the preparer with 160 ml of water, the rate of circulation being set to its maximum. At least three consecutive measurements are taken to determine the initial mean diameter (by volume) of the agglomerates, referred to as dv[0], in accordance with the known Fraunhofer calculation method (Malvern 3$$D calculation matrix). The ultrasound generation (pulse mode: 1 sec ON, 1 sec OFF) is then established at a power of 100% (namely 100% of the maximum position of the "tip amplitude") and the evolution of the mean diameter by volume $d_v[t]$ as a function of the time "t" is monitored for about 8 minutes with one measurement approximately every 10 seconds. After an induction period (about 3-4 minutes), it was noted that the reciprocal of the mean diameter by volume $1/dv_{[t]}$ varies linearly, or substantially linearly, with the time "t" (stable disagglomeration conditions). The disagglomeration rate α is calculated by linear regression of the curve of evolution of $1/d_v[t]$ as a function of the time "t", within the zone of stable disagglomeration conditions (generally, between about 4 and 8 minutes). It is expressed in $\mu m^{-1}$/min.

The aforementioned application WO99/28376 describes in detail a measuring device usable for performing this ultrasound disagglomeration test. It will be recalled that this device consists of a closed circuit within which a flow of agglomerates of particles suspended in a liquid can circulate. This device essentially comprises a sample preparer, a laser granulometer and a treatment cell. A vent to atmospheric pressure, at the level of the sample preparer and of the treatment cell itself, permits continuous elimination of the air bubbles which form during ultrasound generation (action of the ultrasonic probe).

The sample preparer ("Malvern Small Sample Unit MSX1") is intended to receive the sample of silica to be tested (in suspension in the liquid 3) and to send it through the circuit at the pre-controlled speed (potentiometer—maximum speed of approximately 3 l/min), in the form of a flow of liquid suspension. This preparer consists simply of a receiving tank which contains, and through which circulates, the suspension to be analyzed. It is equipped with a stirrer motor of variable speed in order to prevent sedimentation of the agglomerates of particles of the suspension; a centrifugal mini-pump is intended to circulate the suspension in the circuit; the entrance to the preparer is connected to the open air via an opening intended to receive the sample of filler to be tested and/or the liquid used for the suspension. To the preparer there is connected a laser granulometer ("Mastersizer S"), the role of which is to measure continuously, at regular intervals, the average size by volume "$d_v$" of the agglomerates as the flow passes, by means of a measuring cell to which are coupled the automatic recording and calculation means of the granulometer. It should be recalled here briefly that laser granulometers utilize, in known manner, the principle of diffraction of light by solid objects suspended in a medium, the refractive index of which differs from that of the solid. According to the theory of Fraunhofer, there is a relationship between the size of the object and the angle of diffraction of light (the smaller the object, the greater the angle of diffraction). In practice, it is sufficient to measure the amount of light diffracted for different angles of diffraction to be able to determine the size distribution (by volume) of the sample, $d_v$, corresponding to the average size by volume of this distribution ($d_v = \Sigma(n_i d_i^4)/\Sigma(n_i d_i^3)$ with $n_i$ being the number of objects of the size class or diameter $d_i$).

Inserted between the preparer and the laser granulometer there is, finally, a processing cell equipped with an ultrasonic probe, capable of operating in continuous or pulse mode, intended continuously to break up the agglomerates of particles as the flow passes. This flow is thermostatically controlled by means of a cooling circuit arranged, at the level of the cell, in a double casing surrounding the probe, the temperature being controlled, for example, by a heat sensor immersed in the liquid at the level of the preparer.

I-2. Characterization of the Rubber Compositions

The rubber compositions are characterized, before and after curing, as indicated below.

A) Mooney Plasticity:

An oscillating consistometer such as described in French Standard NF T 43-005 (1991) is used. The Mooney plasticity is measured in accordance with the following principle: the composition in the uncured state (i.e. before curing) is molded in a cylindrical enclosure heated to 100° C. After one minute's preheating, the rotor turns within the test piece at 2 rpm, and the torque used for maintaining this movement is measured after four minutes' rotation. The Mooney plasticity (ML 1+4) is expressed in "Mooney units" (MU, with 1 MU=0.83 Newton.meter).

B) Scorching Time:

The measurements are effected at 130° C., in accordance with French Standard NF T 43-005 (1991). The evolution of the consistometric index as a function of time makes it possible to determine the scorching time for the rubber compositions, assessed in accordance with the above standard by the parameter T5 (case of a large rotor), expressed in minutes, and defined as being the time necessary to obtain an increase in the consistometric index (expressed in MU) of 5 units above the minimum value measured for this index.

C) Rheometry:

The measurements are effected at 150° C. with an oscillating-chamber rheometer, in accordance with DIN Standard 53529—part 3 (June 1983). The evolution of the rheometric torque as a function of time describes the evolution of the stiffening of the composition following the vulcanization reaction. The measurements are processed in accordance with DIN Standard 53529—part 2 (March 1983): $t_i$ is the induction delay, that is to say, the time necessary for the start of the vulcanization reaction; $t_\alpha$ (for example $t_{90}$ or $t_{99}$) is the time necessary to achieve a conversion of $\alpha\%$, that is to say $\alpha\%$ (for example 90 or 99%, respectively) of the deviation between the minimum and maximum torques. The conversion rate constant K (expressed in $min^{-1}$) of order 1, calculated between 30% and 80% conversion, is also measured, which makes it possible to assess the vulcanization kinetics.

D) Tensile Tests:

These tests make it possible to determine the elasticity stresses and the properties at break. Unless indicated otherwise, they are effected in accordance with French Standard NF T 46-002 of September 1988. The nominal secant moduli (or apparent stresses, in MPa) at 10% elongation (ME10), 100% elongation (ME100) and 300% elongation (ME300) are measured in a second elongation (i.e. after an accommodation cycle). The breaking stresses (in MPa) and the elongations at break (in %) are also measured. All these tensile measurements are effected under normal conditions of temperature (23±2° C.) and humidity (50±5% relative humidity), in accordance with French Standard NF T 40-101 (December 1979).

Figure 1:
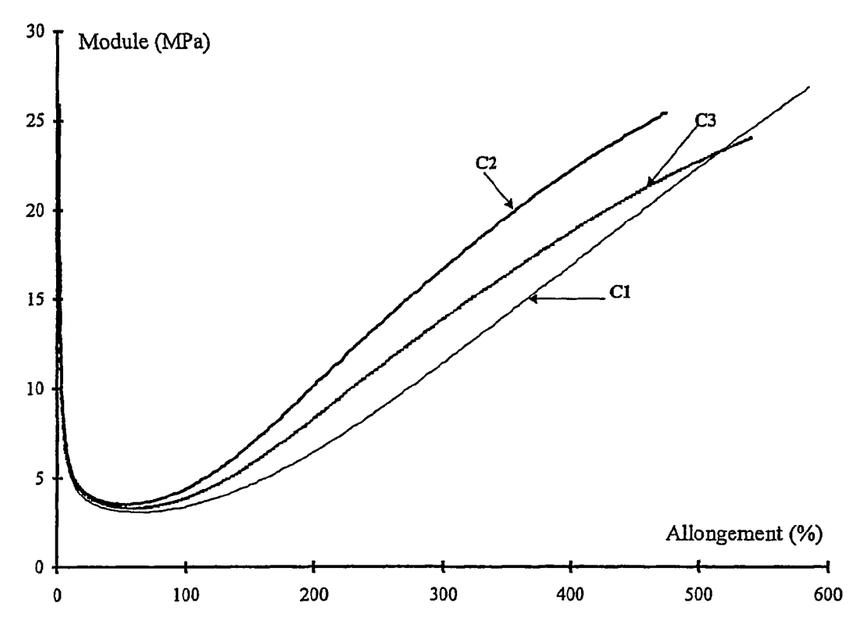

Processing the tensile data recorded also makes it possible to trace the curve of the modulus as a function of the elongation (see attached FIGURE), the modulus used here being the true secant modulus measured in a first elongation, calculated reduced to the real cross-section of the test piece and not to the initial section as previously for the nominal moduli.

E) Dynamic Properties:

The dynamic properties $\Delta G^*$ and $\tan(\delta)_{max}$ are measured on a viscoanalyser (Metravib VA4000), in accordance with Standard ASTM D 5992-96. The response of a sample of vulcanized composition (cylindrical test piece of a thickness of 4 mm and a section of 400 $mm^2$), subjected to an alternating single sinusoidal shearing stress, at a frequency of 10 Hz, under normal conditions of temperature (23° C.) in accordance with Standard ASTM D 1349-99, or at a different temperature, depending on the case, is recorded. Scanning is effected at an amplitude of deformation of 0.1 to 50% (outward cycle), then of 50% to 1% (return cycle). The results used are the complex dynamic shear modulus (G*) and the loss factor $\tan(\delta)$. For the return cycle, the maximum value of $\tan(\delta)$ which is observed, $\tan(\delta)_{max}$, is indicated, as is the deviation in the complex modulus ($\Delta G^*$) between the values at 0.15 and 50% deformation (Payne effect).

F) Shore A Hardness:

The Shore A hardness of the compositions after curing is assessed in accordance with ASTM Standard D 2240-86.

I-3. Characterization of the Tires or Treads

A) Rolling Resistance:

The rolling resistance is measured on a test drum, in accordance with method ISO 87-67 (1992). A value greater than that of the control, which is arbitrarily set to 100, indicates an improved result, that is to say a lower rolling resistance.

B) Wear Resistance:

The tires are subjected to actual on-road travel on a given automobile, until the wear due to running reaches the wear indicators located in the grooves of the tread. A value greater than that of the control, arbitrarily set to 100, indicates an improved result, that is to say a greater mileage travelled.

C) Braking on Dry Ground:

The tires are mounted on an automobile fitted with an ABS braking system and the distance necessary to go from 100 km/h to 0 km/h upon sudden braking on dry ground (asphalt concrete) is measured. A value greater than that of the control, which is arbitrarily set to 100, indicates an improved result, that is to say a shorter braking distance.

D) Braking on Damp Ground:

The tires are mounted on an automobile fitted with an ABS braking system and the distance necessary to go from 50 km/h to 10 km/h upon sudden braking on wetted ground (asphalt concrete) is measured. A value greater than that of the control, which is arbitrarily set to 100, indicates an improved result, that is to say a shorter braking distance.

E) Braking on Ice:

The tires are mounted on an automobile fitted with an ABS braking system on the four wheels, and the distance necessary to go from 20 km/h to 5 km/h upon braking on ice is measured. A value greater than that of the control, which is arbitrarily set to 100, indicates an improved result, that is to say a shorter braking distance.

F) Grip on Damp Ground:

To assess the grip performance on damp ground, the behavior of the tires mounted on a given automobile travelling round a circuit comprising numerous bends and wetted so as to keep the ground damp, under limit speed conditions is analyzed.

On one hand, the minimum time necessary to cover the entire circuit is measured; a value greater than that of the control, which is arbitrarily set to 100, indicates an improved result, that is to say a shorter lap time.

The professional driver of the vehicle, on the other hand, assigns a subjective overall mark for road behavior of the vehicle—and therefore of the tires—on this wetted circuit comprising bends; a mark greater than that of the control, which is arbitrarily set to 100, indicates improved overall behavior.

G) Drift Thrust:

Each tire tested is mounted on a wheel of suitable dimension and inflated to 2.2 bar. It is made to run at a constant speed of 80 km/h on a suitable automatic machine (machine type "sol-plan" sold by MTS). The load "Z" is varied, at a drift angle of 1 degree, and the drift rigidity or thrust "D" (corrected for the thrust at zero drift) is measured in known manner, by recording the transverse force on the wheel as a function of this load Z using sensors. The drift thrust indicated in the tables is the gradient at the origin of the curve D(Z); a value greater than that of the control, which is arbitrarily set to 100, indicates an improved result, that is to say a greater drift thrust. An increase in drift thrust is favorable to the road behavior on dry ground.

II. Conditions of Implementation of the Invention

The tire treads according to the invention are therefore formed, in their entirety or in part, of a rubber composition based on at least:

(v) a diene elastomer;
(vi) as reinforcing filler, more than 80 phr of an inorganic filler constituted in its entirety or in part by a silica having the following characteristics:
  (a) a BET specific surface area of between 50 and 100 m$^2$/g;
  (b) an average particle size, $d_w$, of between 50 and 350 nm;
(vii) an (inorganic filler/diene elastomer) coupling agent providing the bond between the inorganic filler and the diene elastomer;
(viii) a vulcanization system based on sulfur.

Of course, the expression composition "based on" is to be understood to mean a composition comprising the mix and/or the product of reaction in situ of the various constituents used, some of these base constituents being liable to, or intended to, react together, at least in part, during the different phases of manufacture of the treads and tires, in particular during the vulcanization thereof.

II-1. Diene Elastomer

"Diene" elastomer (or rubber) is understood to mean, in known manner, an elastomer resulting at least in part (i.e. a homopolymer or a copolymer) from diene monomers, that is to say, monomers bearing two carbon-carbon double bonds, whether conjugated or not. "Essentially unsaturated" diene elastomer is understood here to mean a diene elastomer resulting at least in part from conjugated diene monomers, having a content of members or units of diene origin (conjugated dienes) which is greater than 15% (mol %). Within the category of "essentially unsaturated" diene elastomers, "highly unsaturated" diene elastomer is understood to mean in particular a diene elastomer having a content of units of diene origin (conjugated dienes) which is greater than 50%.

These general definitions being given, the person skilled in the art of tires will understand that the present invention is used first and foremost with highly unsaturated diene elastomers, in particular with:

(a)—any homopolymer obtained by polymerization of a conjugated diene monomer having 4 to 12 carbon atoms;
(b)—any copolymer obtained by copolymerization of one or more conjugated dienes with each other or with one or more vinyl-aromatic compounds having 8 to 20 carbon atoms.

Suitable conjugated dienes are, in particular, 1,3-butadiene, 2-methyl-1,3-butadiene, 2,3-di($C_1$-$C_5$ alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Suitable vinyl-aromatic compounds are, for example, styrene, ortho-, meta- and para-methylstyrene, the commercial mixture "vinyltoluene", para-tert. butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl-aromatic units. The elastomers may have any microstructure, which is a function of the polymerization conditions used, in particular of the presence or absence of a modifying and/or randomizing agent and the quantities of modifying and/or randomizing agent used. The elastomers may for example be block, statistical, sequential or microsequential elastomers, and may be prepared in dispersion or in solution; they may be coupled and/or starred or alternatively functionalised with a coupling and/or starring or functionalising agent.

The diene elastomer of the tread according to the invention is preferably constituted, in its entirety or in part, to at least 40 phr, more preferably still at least 50 phr, by a highly unsaturated elastomer of the butadiene type, that is to say selected from the group of the highly unsaturated diene elastomers constituted by polybutadienes (BR), butadiene copolymers and mixtures of these elastomers. These butadiene copolymers are in particular butadiene-styrene copolymers (SBR), butadiene-isoprene copolymers (BIR) or isoprene-butadiene-styrene copolymers (SBIR).

Suitable preferred butadiene elastomers are in particular BRs having a content of 1,2-units of between 4% and 80% or those having a content of cis-1,4 greater than 80%, SBRs having a styrene content of between 5% and 50% by weight and more particularly between 20% and 40%, a content of-1,2 bonds of the butadiene fraction of between 4% and 65%, a content of trans-1,4 bonds of between 20% and 80%, BIRs having an isoprene content of between 5% and 90% by weight and a glass transition temperature ("Tg" measured in accordance with ASTM Standard D3418-82) of −40° C. to −80° C. In the case of SBIR copolymers, those which are suitable are in particular those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene fraction of between 4% and 85%, a content of trans-1,4 units of the butadiene fraction of between 6% and 80%, a content of 1,2-plus 3,4-units of the isoprene fraction of between 5% and 70%, and a content of trans-1,4 units of the isoprene fraction of between 10% and 50%, and more generally any SBIR having a Tg of between −20° C. and −70° C.

The butadiene elastomer is particularly selected from among the BRs, the SBRs and mixtures of these elastomers.

Preferably, in the case of a tread for a tire for passenger vehicles, the butadiene elastomer is majoritarily an SBR elastomer, be it an SBR prepared in emulsion ("ESBR") or an SBR prepared in solution ("SSBR"), or a mixture of SBR and another diene elastomer, in particular a butadiene elastomer, for example of a blend of SBR and BR, of SBR and NR (natural rubber), or of SBR and IR (synthetic polyisoprene).

In particular an SBR having a styrene content of between 20% and 30% by weight, a content of vinyl bonds of the butadiene fraction of between 15% and 65%, a content of trans-1,4 bonds of between 15% and 75%, and a Tg of between −20° C. and −55° C. is used. Such an SBR copolymer, preferably an SSBR, is possibly used in a mixture with BR having preferably more than 90% cis-1,4 bonds.

The compositions of the treads of the invention may contain a single diene elastomer or a mixture of several diene elastomers, the diene elastomer(s) possibly being used in association with any type of synthetic elastomer other than a diene one, or even with polymers other than elastomers, for example thermoplastic polymers.

II-2. Reinforcing Inorganic Filler ("LS"silica)

The tread according to the invention has the essential characteristic of being reinforced to more than 80 phr by a reinforcing inorganic filler comprising, preferably in a majority proportion, a specific silica having a very low specific surface area having the following characteristics:

(a) a BET specific surface area of between 50 and 100 m$^2$/g;
(b) an average particle size $d_w$ of between 50 and 350 nm.

Silicas of low BET surface area able to meet this definition are known and have been described in particular in applications EP 157 703, EP 396 450 or EP 722 977. As already indicated, their known application in tires had hitherto been limited to parts of the tire other than its tread, in particular in internal mixes used for example for calendaring crown or carcass reinforcement plies.

It will be recalled that "reinforcing inorganic filler" is to be understood in known manner to mean an inorganic or mineral filler, whatever its color and its origin (natural or synthetic), also referred to as "white" filler or sometimes "clear" filler, in contrast to carbon black, which is capable, on its own, without any other means than an intermediate coupling agent, of reinforcing a rubber composition intended for the manufacture of tires, in other words which is capable of replacing a conventional tire-grade carbon black filler in its reinforcement function.

This "LS" specific silica (for "Low Surface") first of all has a BET surface area which is unusual for a tread application, of between 50 and 100 m$^2$/g. For a BET surface area of less than 50 m$^2$/g, although the rubber compositions have easier working and a reduced hysteresis, a decline in the breaking properties and wear resistance in the tire which diminishes in crippling manner are observed. For a BET surface area greater than 100 m$^2$/g, in particular of between 150 and 250 m$^2$/g, there is the disadvantage of conventional silicas of high specific surface area for treads of "Green Tires", namely on one hand reduced dispersibility in the rubber matrix and processing difficulties in the uncured state, owing to parasitic interactions with certain other ingredients of the rubber compositions (in particular vulcanization system), and on the other hand the necessity of using a greater amount of coupling agent.

The LS silica must on the other hand have a size $d_W$ of between 50 and 350 nm. For excessively large sizes $d_W$, greater than 350 nm, the particles act like defects which localize stresses and are harmful in terms of wear; sizes $d_W$ which are too small, less than 50 nm, on the other hand, adversely affect working in the uncured state and the dispersion of the filler during this working.

Finally, for applications in which the highest level of reinforcement is required, the LS silica used will furthermore, preferably, have a high intrinsic dispersibility, illustrated by a disagglomeration rate α (measured in the ultrasound disagglomeration test described in section I above) greater than 5×10$^{-3}$ μm$^{-1}$/min, more preferably at least equal to 1×10$^{-2}$ μm$^{-1}$/min. For such a disagglomeration rate, it has been noted that the LS silica had a very high dispersibility, that is to say that few micronic agglomerates are observed by optical microscopy reflection on a section of rubber composition prepared in accordance with the rules of the art.

For the various reasons indicated above, the LS silica selected preferably satisfies at least one, more preferably all, of the following characteristics:
- a BET surface area within a range from 60 to 90 m$^2$/g;
- an average particle size $d_W$ of between 100 and 300 nm;
- a disagglomeration rate α greater than 5×10$^{-3}$ μm$^{-1}$/min.

Even more preferably, this LS silica satisfies all of the following characteristics:
- a BET surface area within a range from 60 to 90 m$^2$/g;
- a particle size $d_W$ within a range from 150 to 250 nm;
- a disagglomeration rate α at least equal to 1×10$^{-2}$ μm$^{-1}$/min.

The physical state in which the LS silica may be present is immaterial, whether it be in the form of a powder, microbeads, granules, pellets, balls or any other densified form; it may be a precipitated silica or a pyrolysed silica. Its ratio of BET/CTAB surface area preferably lies within a range from 1.0 to 1.5, more preferably from 1.0 to 1.2.

The LS silica above may advantageously constitute the entire reinforcing inorganic filler.

However, another reinforcing inorganic filler may possibly be associated with this LS silica, for example a conventional reinforcing silica having a higher specific surface area. In such a case, the LS silica preferably constitutes at least 50% by weight of the total reinforcing inorganic filler, more preferably still more than 80% by weight of this total reinforcing inorganic filler.

Preferably, the amount of reinforcing inorganic filler, that is to say of LS silica when the latter constitutes the entire reinforcing inorganic filler, is greater than 90 phr, more preferably lies within a range from 100 to 150 phr, the optimum of course being different according to the type of tire desired.

With the LS silica there may be also associated a conventional tire-grade carbon black, selected in particular from among the blacks of the type HAF, ISAF, SAF which are conventionally used in treads for tires (for example, blacks N115, N134, N234, N330, N339, N347, N375). This carbon black is then preferably used in a small proportion, in an amount of between preferably 2 and 20 phr, more preferably within a range from 5 to 15 phr. Within the ranges indicated, there is a benefit to be had from the coloring properties (black pigmentation agent) and anti-UV properties of the carbon blacks, without furthermore adversely affecting the typical performance provided by the LS silica.

Finally, the person skilled in the art will understand that, as filler equivalent to a reinforcing inorganic filler, there could be used a reinforcing filler of organic type, in particular a carbon black for tires, covered at least in part with an inorganic layer, in particular of silica, which for its part requires the use of a coupling agent to provide the connection to the elastomer.

II-3. Coupling Agent

It will be recalled here that (inorganic filler/elastomer) "coupling agent" is to be understood to mean, in known manner, an agent capable of establishing a sufficient chemical and/or physical bond between the inorganic filler and the diene elastomer; such a coupling agent, which is at least bifunctional, has, for example, the simplified general formula "Y-T-X", in which:

Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica);

X represents a functional group ("X" function) which is capable of bonding physically and/or chemically with the diene elastomer, for example by means of a sulfur atom;

T represents a divalent organic group making it possible to link Y and X.

It will be recalled that the coupling agents must not be confused with simple agents for covering the inorganic filler which, in known manner, may comprise the "Y" function which is active with respect to the inorganic filler but are devoid of the "X " function which is active with respect to the diene elastomer.

(Silica/diene elastomer) coupling agents, of variable effectiveness, have been described in a very large number of documents and are well-known to the person skilled in the art. Any known coupling agent likely to ensure, in the diene rubber compositions usable for the manufacture of tire treads, the effective bonding between a reinforcing inorganic filler such as silica and a diene elastomer, in particular organosilanes or polyfunctional polyorganosiloxanes bearing the functions X and Y mentioned above, may be used.

In particular polysulfurised silanes, which are referred to as "symmetrical" or "asymmetrical" depending on their specific structure, are used, such as those described for example in the patents or patent applications FR 2 149 339, FR 2 206 330, U.S. Pat. Nos. 3,842,111, 3,873,489, 3,978,103, 3,997,581, 4,002,594, 4,072,701, 4,129,585, 5,580,919, 5,583,245, 5,650,457, 5,663,358, 5,663,395, 5,663,396, 5,674,932, 5,675,014, 5,684,171, 5,684,172, 5,696,197, 5,708,053, 5,892,085 or EP 1 043 357.

Particularly suitable for implementing the invention, without the definition below being limitative, are symmetrical polysulfurised silanes which satisfy the following general formula (I):

$$Z\text{-}A\text{-}S_n\text{-}A\text{-}Z, \text{ in which:} \quad (I)$$

n is an integer from 2 to 8 (preferably from 2 to 5);

A is a divalent hydrocarbon radical (preferably $C_1$-$C_{18}$ alkylene groups or $C_6$-$C_{12}$ arylene groups, more particularly $C_1$-$C_{10}$ alkylenes, notably $C_1$-$C_4$ alkylenes, in particular propylene);

Z corresponds to one of the formulae below:

in which:
- the radicals $R^1$, which may or may not be substituted, and may be identical or different, represent a $C_1$-$C_{18}$ alkyl group, a $C_5$-$C_{18}$ cycloalkyl group or a $C_6$-$C_{18}$ aryl group, (preferably $C_1$-$C_6$ alkyl groups, cyclohexyl or phenyl, in particular $C_1$-$C_4$ alkyl groups, more particularly methyl and/or ethyl).
- the radicals $R^2$, which may or may not be substituted, and may be identical or different, represent a hydroxyl group, a $C_1$-$C_{18}$ alkoxyl group or a $C_5$-$C_{18}$ cycloalkoxyl group (preferably a group selected from among hydroxyl, $C_1$-$C_8$ alkoxyls and $C_5$-$C_8$ cycloalkoxyls, more preferably still a group selected from among hydroxyl and $C_1$-$C_4$ alkoxyls, in particular methoxyl and ethoxyl).

In the case of a mixture of polysulfurised silanes of the formula (I) above, in particular the conventional mixtures available commercially, it will be understood that the average value of the "n"s is a fractional number, preferably within a range from 2 to 5.

As examples of polysulfurised silanes, mention will be made more particularly of the polysulfides (in particular disulfides, trisulfides or tetrasulfides) of bis-(($C_1$-$C_4$)alkoxyl-($C_1$-$C_4$)alkylsilyl($C_1$-$C_4$)alkyl), such as for example bis(3-trimethoxysilylpropyl) or bis(3-triethoxysilylpropyl) polysulfides. Of these compounds, bis(3-triethoxysilylpropyl)tetrasulfide, abbreviated TESPT, of the formula $[(C_2H_5O)_3Si(CH_2)_3S_2]_2$ or bis(triethoxysilylpropyl) disulfide, abbreviated TESPD, of the formula $[(C_2H_5O)_3Si(CH_2)_3S]_2$, are used in particular.

TESPD is sold, for example, by Degussa under the name Si75 (in the form of a mixture of disulfide—75% by weight—and of polysulfides), or alternatively by Witco under the name Silquest A1589. TESPT is sold, for example, by Degussa under the name Si69 (or X50S when it is supported to 50% by weight on carbon black), or alternatively by Osi Specialties under the name Silquest A1289 (in both cases, a commercial mixture of polysulfides having an average value of n which is close to 4).

The person skilled in the art will be able to adjust the content of coupling agent in the compositions of the invention, according to the intended application, the nature of the elastomer used, and the quantity of LS silica, supplemented if applicable by any other inorganic filler used as supplementary reinforcing filler.

It has proved that the use of an LS silica, in the treads according to the invention, makes it possible substantially to reduce the amount of coupling agent, in particular of polysulfurised silane, relative to the conventional amounts used in the presence of a conventional silica having a higher specific surface area. Thus, in these treads of the invention, the amount of coupling agent, in particular of polysulfurised silane, is preferably of between 2 and 5 phr, more preferably within a range from 3 to 4.5 phr. Reduced to the weight of reinforcing inorganic filler, in particular of LS silica when the latter constitutes the entire reinforcing inorganic filler, this amount of coupling agent is advantageously less than 8%, more preferably less than 6% by weight relative to the weight of reinforcing inorganic filler.

The coupling agent used could be grafted beforehand (via the "X" function) on to the diene elastomer of the composition of the invention, the elastomer thus functionalised or "precoupled" then comprising the free "Y" function for the reinforcing inorganic filler. The coupling agent could also be grafted beforehand (via the "Y" function) on to the reinforcing inorganic filler, the filler thus "precoupled" then being able to be bonded to the diene elastomer by means of the free "X" functions. However, it is preferred to use the coupling agent in the free (i.e. non-grafted) state or grafted on to the reinforcing inorganic filler, in particular for reasons of better processing of the compositions in the uncured state.

Finally, there may possibly be associated with the coupling agent an appropriate "coupling activator", that is to say, a body (single compound or association of compounds) which, when mixed with this coupling agent, increases the effectiveness of the latter (see, for example, aforementioned applications WO00/5300 and WO00/5301).

II-4. Vulcanization System

The base vulcanization system is constituted of sulfur and a primary vulcanization accelerator. To this basic vulcanization system there are added, incorporated during the first, non-productive phase and/or during the productive phase, various known secondary accelerators or vulcanization activators.

The primary vulcanization accelerator is preferably an accelerator of the sulfenamide type. The use of LS silica makes it possible substantially to reduce the overall amount of sulfur and sulfenamide accelerator to a preferred value of between 1.25 and 2.75 phr, more preferably within a range from 1.5 to 2.5 phr, the sulfur and sulfenamide accelerator furthermore each being used, even more preferably, in an amount of between 0.5 and 1.5 phr.

Preferably a guanidine derivative, in particular diphenylguanidine (DPG), incorporated during the first, non-productive phase (preferred embodiment of the invention) and/or during the productive phase, is used as secondary vulcanization accelerator. This guanidine derivative furthermore advantageously acts as a covering agent for the LS silica. The use of LS silica here again makes it possible advantageously to reduce the overall amount of sulfur, sulfenamide and guanidine derivative to a preferred value within a range from 1.75 to 4.25, more preferably within a range from 2 to 4 phr.

Upon the curing of the treads or tires according to the invention, it was observed that using an LS silica, in particular when the latter constitutes the entire reinforcing inorganic filler, nevertheless had the drawback of substantially increasing the induction delays (times necessary at the start of the vulcanization reaction), in a manner which could be deemed crippling with respect to industrial curing conditions.

The above drawback has been unexpectedly overcome by a substantial reduction in the amount of zinc in the rubber composition.

Thus, according to a particularly preferred embodiment of the invention, a very small quantity of zinc, of between 0.50 and 1.5 phr, more preferably within a range from 0.7 to 1.3 phr, is used as vulcanization activator.

This specific quantity of zinc may be supplied to the rubber composition in any manner known to the person skilled in the art, preferably in the form of zinc oxide, in this case consequently used in an equivalent preferred amount of between 0.6 and 1.9 phr, more preferably within a range from 0.9 to 1.6 phr.

Preferably a fatty acid, more preferably stearic acid, present in a preferred amount of 0.5 to 3 phr, more preferably of 1 to 3 phr, is associated with this zinc oxide.

All or part of the zinc used may also be incorporated in the treads and their compositions in the form of a fatty acid zinc salt, in particular in the form of zinc stearate, or alternatively another zinc donor compound which is active with respect to the vulcanization.

Reduced induction delays and therefore curing times are in particular advantageous for treads intended for recapping, be it "cold" recapping (use of a precured tread) or conventional "hot" recapping (use of a tread in the uncured state). In this latter case, a reduced curing time, in addition to the fact that it reduces the production costs, limits the overcuring (or post-curing) imposed on the rest of the casing ("carcass") of the worn tire (already vulcanized).

II-5. Various Additives

Of course, the elastomeric compositions of the treads according to the invention also comprise all or part of the conventional additives used in rubber compositions intended for the manufacture of tire treads, such as, for example, extender oils, plasticizers, protective agents such as anti-ozone waxes, chemical antiozonants, antioxidants, anti-fatigue agents, coupling activators, reinforcing resins or methylene acceptors and/or donors. There may also be associated with the LS silica, if necessary, a conventional poorly reinforcing or non-reinforcing white filler, such as particles of clay, bentonite, talc, chalk, kaolin, which are usable for example in colored tire treads.

The elastomeric compositions may also contain, in addition to the coupling agents previously described, covering agents for inorganic fillers, comprising for example the single Y function, or more generally processing aids liable, in known manner, owing to an improvement in the dispersion of the reinforcing inorganic filler in the rubber matrix and to a reduction in the viscosity of the compositions, to improve their ability to be worked in the uncured state; these agents, used in a preferred amount of between 0.5 and 3 phr, are, for example, alkylalkoxysilanes, in particular alkyltriethoxysilanes, such as 1-octyl-triethoxysilane sold by Degussa-Hüls under the name Dynasylan Octeo or 1-hexa-decyl-triethoxysilane sold by Degussa-Hüls under the name Si216, polyols, polyethers, (for example polyethylene glycols), primary, secondary or tertiary amines (for example trialkanolamines), hydroxylated or hydrolysable polyorganosiloxanes, for example α,ω-dihydroxy-polyorganosiloxanes (in particular α,ω-dihydroxy-polydimethylsiloxanes).

II-5. Preparation of the Compositions and Treads

The elastomeric compositions are produced in suitable mixers, using two successive preparation phases well-known to the person skilled in the art: a first phase of thermomechanical working or kneading (sometimes referred to as "non-productive" phase) at high temperature, up to a maximum temperature ($T_{max}$) of between 110° C. and 190° C., preferably between 130° C. and 180° C., followed by a second phase of mechanical working (sometimes referred to as "productive" phase) at lower temperature, typically less than 110° C., for example between 40° C. and 100° C., during which finishing phase the base vulcanization system is incorporated; such phases have been described for example in the aforementioned applications EP 501 227, EP 735 088, WO00/05300 or WO00/05301.

The process for manufacturing the compositions according to the invention is characterized in that at least the LS silica (whether or not associated with another reinforcing inorganic filler or a carbon black) and the coupling agent are incorporated by kneading into the diene elastomer during the first, so-called non-productive, phase, that is to say that at least these different base constituents are introduced into the mixer and are kneaded thermomechanically, in one or more steps, until a maximum temperature of between 110° C. and 190° C., preferably between 130° C. and 180° C., is reached.

All or part of the vulcanization activator, constituted by the very small quantity of zinc of between 0.50 and 1.5 phr, may be introduced during the non-productive phase or alternatively the productive phase.

By way of example, the first (non-productive) phase is effected in a single thermomechanical step during which in a first phase all the base constituents necessary (diene elastomer, reinforcing inorganic filler and coupling agent), then in a second phase, for example after one to two minutes' kneading, any complementary covering agents or processing agents and other various additives, including in particular zinc and DPG, with the exception of the base vulcanization system constituted by sulfur and primary accelerator, in particular sulfenamide, are introduced into a suitable mixer, such as a conventional internal mixer; as the apparent density of the LS silica is generally low, it may be advantageous to divide the introduction thereof into two or more parts.

A second (or even several) step(s) of thermomechanical working may be added to this internal mixer, after the mixture has dropped and after intermediate cooling (cooling temperature preferably less than 100° C.), with the aim of making the compositions undergo complementary thermomechanical treatment, in particular in order to improve further the dispersion, in the elastomeric matrix, of the reinforcing inorganic filler and its coupling agent. The total duration of the kneading, in this non-productive phase, is preferably between 2 and 10 minutes.

After cooling the mixture thus obtained, the sulfur and primary accelerator are then incorporated at low temperature, generally in an external mixer such as an open mill; the entire mixture is then mixed (productive phase) for several minutes, for example between 5 and 15 minutes.

The final composition thus obtained is then calendered, for example in the form of thin slabs (thickness of 2 to 3 mm) or thin sheets of rubber in order to measure its physical or mechanical properties, in particular for laboratory characterisation, or alternatively extruded to form rubber profiled elements used directly, after cutting out or assembly to the dimensions desired, as treads for tires.

In summary, the process for preparing a tire tread according to the invention comprises the following steps:

incorporating in a diene elastomer, during a first step referred to as "non-productive":
as reinforcing filler, more than 80 phr of an inorganic filler constituted in its entirety or in part by a silica having the following characteristics:
(a) a BET specific surface area of between 50 and 100 $m^2/g$;
(b) an average particle size $d_w$ of between 50 and 350 nm;
and a coupling agent providing the bond between the silica and the diene elastomer;
thermomechanically kneading the entire mixture, in one or more stages, until a maximum temperature of between 110° C. and 190° C. is reached;
cooling the entire mixture to a temperature of less than 100° C.;
then incorporating, during a second step referred to as "productive", sulfur and a primary vulcanization accelerator;
kneading the entire mixture until a maximum temperature less than 110° C. is reached;
calendaring or extruding the elastomeric composition thus obtained in the form of a tire tread.

The vulcanization or curing of the tread or of the tire is carried out in known manner at a temperature preferably of between 130° C. and 200° C., preferably under pressure, for a sufficient time which may vary for example between 5 and 90 min as a function in particular of the curing temperature, the vulcanization system adopted, the vulcanization kinetics of the composition in question and the size of the tire.

The rubber compositions previously described based on LS silica generally constitute the entire tread according to the invention. However, the invention also applies to those cases in which these rubber compositions form only part of a composite-type tread, formed for example of different transversely adjacent treads, or alternatively of two radially superposed layers of different constitutions, the part filled with LS silica possibly constituting for example the radially outer layer of the tread intended to come into contact with the ground from the start of running of the new tire, or on the contrary its radially inner layer intended to come into contact with the ground at a later date.

It goes without saying that the present invention relates to the treads and tires previously described, both in the "uncured" state (i.e. before curing) and in the "cured" or vulcanized state (i.e. after vulcanization).

III. Examples of Embodiment of the Invention

III-1. Fillers Used

The characteristics of the fillers used in the following examples are set forth in Table 1. The filler A is a conventional reinforcing silica of high specific surface area (BET approximately 160 $m^2/g$), reference inorganic filler for the reinforcement of the treads of "Green Tires" (silica "Zeosil 1165 MP" from Rhodia). The filler B is a silica having a very low specific surface area (BET close to 90 $m^2/g$) intended conventionally for internal mixes for calendaring tire crown reinforcement plies (ratio BET/CTAB equal to 1.1).

The characteristics of BET surface area and size $d_w$ therefore distinctly differentiate the two fillers, filler B having a surface which is twice as low per unit of weight and an average particle size $d_w$ which is more than twice as great. The two silicas are both furthermore characterized by a high intrinsic dispersibility, illustrated by a very high disagglomeration rate α (approximately $1.25\times10^{-2}$ $\mu m^{-1}$/min for A and $1\times10^{-2}$ $\mu m^{-1}$/min for B).

It will be noted that the LS silica satisfies the following preferred characteristics:
a BET surface area within a range from 60 to 90 $m^2/g$;
a particle size $d_w$ within a range from 150 to 250 nm;
a disagglomeration rate α at least equal to $1\times10^{-2}$ $\mu m^{-1}$/min.

III-2. Preparation of the Compositions

For the following tests, the procedure is as follows: the diene elastomer (or the mixture of diene elastomers, if applicable), the reinforcing filler, the coupling agent, then, after one to two minutes' kneading, the various other ingredients, with the exception of the sulfur and the sulfenamide primary accelerator, are introduced into an internal mixer filled to 70%, the initial tank temperature of which is approximately 60° C. Thermomechanical working (non-productive phase) is then performed in one or two steps (total duration of kneading equal to about 7 minutes), until a maximum "dropping" temperature of about 160-165° C. is reached.

The mixture thus obtained is recovered, it is cooled and then the sulfur and sulfenamide accelerator are added on an external mixer (homo-finisher) at 30° C., by mixing everything (productive phase) for 3 to 4 minutes.

The compositions are then either calendered in the form of plates (thickness of 2 to 3 mm) in order to measure their physical or mechanical properties, or extruded directly in the form of tire treads.

In the tests which follow, the LS silica advantageously constitutes the entire reinforcing inorganic filler, associated with a small amount of carbon black (less than 10 phr).

III-3. Tests

The aim of these tests is to demonstrate the improved performances of an elastomeric composition based on LS silica, compared with a control composition using a conventional LS silica (high specific surface area) for a tread for a "Green Tire".

For this, three butadiene rubber compositions (SBR/BR blend) intended for the manufacture of treads for passenger-car tires are compared:
composition C-1 (control): filler A (60 phr), with coupling agent TESPT;
composition C-2 (invention): filler B (85 phr), with coupling agent TESPT;
composition C-3 (invention): silica B (85 phr), with coupling agent TESPD.

The butadiene elastomer is constituted of an SSBR comprising 25% of styrene, 58% of 1-2 polybutadiene units, and 23% of trans 1-4 polybutadiene, with which there is associated a BR having more than 90% cis-1,4 bonds. The amount of total reinforcing filler, constituted by the LS silica and a small quantity of carbon black (less than 10 phr) is greater than 90 phr in the compositions according to the invention.

Tables 2 and 3 show in succession the formulation of the different compositions (Table 2—amount of the different products expressed in phr), and their properties before and after curing at 150° C. for 40 minutes (Table 3). The attached FIGURE shows the curves of modulus (in MPa) as a function of the elongation (in %); these curves are marked C1 to C3, and correspond to compositions C-1 to C-3 respectively.

The amount of silica is therefore greater by more than 40% (85 phr instead of 60 phr) in the compositions according to the invention (C-2 and C-3) which, compared with the control composition (C-1), furthermore have the following advantageous characteristics, in particular from the point of view of costs:

an amount by weight of coupling agent, relative to the weight of silica, which is distinctly reduced (less than 5% compared with 8% for the control composition);

a reduced overall amount of sulfur and sulfenamide accelerator (2.6 phr instead of 3.1 phr), just like the overall amount of sulfur, sulfenamide accelerator and guanidine derivative (3.6 phr instead of 4.6 phr).

The amount of ZnO has been reduced by 40% (1.5 phr instead of 2.5 phr in the control composition) in the compositions C-2 and C-3 in order to bring their induction delay ($t_i$) to a value comparable to that of the control, an amount of 2.5 phr resulting for example for composition C-2 in an induction delay which is increased by close to 50%, which increase is deemed to be crippling with regard to industrial curing conditions.

These comments on the formulation being given, a study of the results of Table 3 demonstrates, for the compositions based on LS silica, compared with the control composition:

a viscosity in the uncured state which is admittedly increased, but satisfactory (at most 95 MU), in any case less than that which would be observed for the control composition at an equal amount (85 phr) of conventional silica of high specific surface area (in this latter case, more than 100 MU for the control solution);

rheometric properties at least equivalent, if not improved for composition C-2 based on TESPT coupling agent, as illustrated by the values T5, $t_i$, $t_{90}$, $t_{90}$-$t_i$ and finally K;

equivalent hysteresis properties ($\Delta G^*$ and tan($\delta$)max);

finally and above all, even more unexpectedly for the person skilled in the art, reinforcement properties after curing which are at least equal to or even greater than those of the control solution: Shore hardness equivalent but moduli at high deformation (ME100, ME300) and ratio ME300/ME100 distinctly higher, both indicators of a high quality of the reinforcement provided by the LS silica.

The appended FIGURE confirms these results with, for elongations of 100% and more, a modulus which is greater in the case of compositions C-2 and C-3 (curves C2 and C3 above the curve C1), which is proof of a strong interaction between the diene elastomer and the LS silica.

Such results must now face real running tests on the treads, as set forth in Test 2 which follows.

B) Test 2

The above compositions C-1 and C-2 are used in this test as treads for passenger-car tires having a radial carcass, of dimension 175/70 R14 (speed index T), which are conventionally manufactured and identical in all points except for the rubber composition constituting the tread: composition C-1 for the control "Green Tires" (P-1), composition C-2 for the tires of the invention (P-2).

The tires were first of all tested on a machine to determine their rolling resistance and their drift thrust, then mounted on a vehicle for the rest of the tests.

All the running results are summarized in Table 4.

It will be noted first of all that the rolling resistance of the two types of tire is equivalent, which is synonymous of a low fuel consumption for a vehicle fitted with tires according to the invention.

The tires are then subjected to on-road travel on a passenger car of the marque Citroën Xsara, in order to determine the wear resistance. In known manner, the wear resistance of the tread, during the travel of the tire, is directly correlated to the level of reinforcement provided by the reinforcing filler and its associated coupling agent. In other words, the measurement of the wear resistance is an excellent indicator, if not the best since it is evaluated on the final manufactured product, of the overall performance of the inorganic filler used. It will then be noted that the tire according to the invention exhibits a performance identical to that of the control tire.

Thus, despite using a silica having a very small specific surface area, a reduced amount of coupling agent and of vulcanization agents, it is possible to maintain an excellent compromise (rolling resistance/wear resistance), which is at least as good as that available on conventional "Green Tires" reinforced with silica of higher specific surface area, which already constitutes a remarkable and unexpected result for the person skilled in the art.

It will furthermore be noted that the drift thrust, which is indicative to the person skilled in the art of the road behavior on dry ground, is substantially increased, with a recorded gain of 4%.

The tires are finally mounted on another passenger vehicle to be subjected to the braking and grip tests described in section I-3, in accordance with the following particular conditions:

braking (on dry or damp ground): VW vehicle model "Polo GT" (nominal pressures at the front and rear), the tires to be tested being mounted at the front of the vehicle;

travel on a damp circuit comprising bends: VW vehicle model "Golf" (nominal pressures at the front and rear), the tires to be tested being mounted at the front and rear of the vehicle.

The tires P-2 first of all exhibit a significant gain of 4% as far as the braking on wet ground is concerned. The running test on a damp circuit comprising bends for its part confirms that using the LS silica results in a significant improvement in grip, illustrated both by a reduction in the minimum time necessary to cover the circuit under limit speed conditions (lap time reduced by one second per lap) and by the evolution of the behavior mark attributed by the driver (increase of 8%), these two variations being very significant for such a test.

In summary, the tire of the invention exhibits a compromise (rolling resistance/wear resistance/behavior/grip) which is improved overall relative to the reference formed by the treads of the control "Green Tires" P-1, with in particular an improvement both in the road behavior and in the grip on wet, snow-covered or icy ground.

C) Test 3

This test confirms the advantage of an LS silica in a tread the diene matrix of which is different from the previous one, constituted of a blend of butadiene elastomer (BR) and natural rubber.

The tread is intended for passenger-car tires of "winter" type having a high degree of grip on snow and ice.

The two compositions tested differ from each other essentially in the following characteristics:

composition C-4 (control): silica A (65 phr);

composition C-5 (according to the invention): silica B (85 phr).

Tables 5 and 6 show in succession the formulation of the different compositions (Table 5—amount of the different products expressed in phr), and their properties before and after curing at 150° C. for 40 minutes (Table 6).

The amount of silica is therefore distinctly greater in the tread according to the invention, the amount of total reinforcing filler (LS silica plus carbon black) of which is greater than 90 phr.

The coupling agent is TESPT in both cases, its amount by weight relative to the weight of silica however being distinctly reduced in the tread according to the invention (less than 5% compared with 8.7% for the control solution).

A study of the results of Table 6 shows that the composition based on LS silica, compared with the control composition, is characterized in particular by:
- an equivalent viscosity in the uncured state;
- a scorching time T5 which is admittedly increased, but can be corrected by a reduction in the amount of zinc (T5<20 min for 1.5 phr of ZnO);
- after curing, reinforcement properties which appear improved relative to those of the control solution (ME100, ME300 and ratio ME300/ME100 higher), which is a clear indicator of a high level of reinforcement and therefore of wear resistance for the tread of the invention;
- finally, hysteresis properties which are substantially improved (values distinctly lower for $\Delta G^*$ and $\tan(\delta)_{max}$), making it possible to predict a reduced rolling resistance.

Compositions C-4 and C-5 were then tested as treads for winter tires, of dimension 175/70 R14, which are conventionally manufactured and identical in all points except for the composition used: C-4 for the control tires (P-4), C-5 for the tires of the invention (P-5). The tires were tested on a machine and on a vehicle, in accordance with what is stated in Test 2 above and section I-3, to determine on one hand their rolling resistance, and on the other hand their grip (braking test) both on wet ground and on ice.

The running results of Table 7 show the superiority of the tires according to the invention, the performances of rolling resistance, braking on wet ground and braking on ice being all three improved, a result which is particularly advantageous for tires of winter type.

In summary, the specific silicas which meet the characteristics described above, of a very low specific surface area and preferably of high dispersibility, when they are used in treads in an amount of reinforcing inorganic filler which is as high as that advocated, have proved, unexpectedly for the person skilled in the art, capable of offering these treads an improved overall compromise of performances during travel, while making it possible to reduce their supplementary cost owing to a possible reduction in the amounts of coupling agent and amounts of vulcanization agents.

Compared with silicas of high specific surface area, the LS silicas previously described, owing to their distinctly reduced specific surface area, have numerous advantages:
- fewer parasitic interactions, on one hand between the particles of silica themselves (reduced risks of re-agglomeration in the rubber matrix), and on the other hand between the particles of silica and the other rubber additives;
- overall improvement in the dispersibility in the diene matrix, during the kneading operations, and therefore in the processing of the compositions in the uncured state;
- possible reduction in the quantities of coupling agent and of vulcanization agents, in particular of sulfur and sulfenamide accelerator, which results in a reduction in the costs of the formulation.

Although, in compensation, these LS silicas have the drawback of extending the induction delays in the curing of the treads, it has been found that this problem could be solved due to the use of a very small quantity of zinc in the compositions, contributing at the same time to the reduction in the industrial costs.

TABLE 1

| silica filler: | A | B |
|---|---|---|
| BET surface area (m²/g) | 160 | 89 |
| $d_w$ (nm) | 85 | 206 |

(A) silica of high BET specific surface area (CTAB: 157.5 m²/g);
(B) silica of very low BET specific surface area (CTAB: 81 m²/g).

TABLE 2

| | Composition No. | | |
|---|---|---|---|
| | C-1 | C-2 | C-3 |
| SBR (1) | 88.5 | 88.5 | 88.5 |
| BR (2) | 25 | 25 | 25 |
| silica A | 60 | — | — |
| silica B | — | 85 | 85 |
| carbon black (3) | 6 | 6 | 6 |
| aromatic oil (4) | 7.6 | 7.6 | 7.6 |
| TESPT (5) | 4.8 | 3.8 | — |
| TESPD (6) | — | — | 3.7 |
| DPG (7) | 1.5 | 1.0 | 1.0 |
| zinc (ZnO) (8) | 2 (2.5) | 1.2 (1.5) | 1.2 (1.5) |
| stearic acid | 2 | 2 | 2 |
| paraffin (9) | 1.5 | 1.5 | 1.5 |
| antioxidant (10) | 2.0 | 2.0 | 2.0 |
| sulfur | 1.3 | 1.3 | 1.3 |
| accelerator (11) | 1.8 | 1.3 | 1.3 |

(1) SSBR with 59.5% of 1-2 polybutadiene units; 26.5% of styrene; Tg = −29° C.; 75 phr dry SBR extended with 18% by weight of aromatic oil (namely a total of SSBR + oil equal to 88.5 phr);
(2) BR with 4.3% of 1-2; 2.7% of trans; 93% of cis 1-4 (Tg = −106° C.);
(3) carbon black N234;
(4) aromatic oil in free form ("Enerflex 65" from BP);
(5) TESPT ("Si69" from Degussa);
(6) TESPD ("Si75" from Degussa);
(7) diphenylguanidine ("Vulcacit D" from Bayer);
(8) zinc supplied in the form of ZnO (rubber grade);
(9) mixture of macro- and microcrystalline anti-ozone waxes;
(10) N-1,3-dimethylbutyl-N-phenyl-para-phenylenediamine ("Santoflex 6-PPD" from Flexsys);
(11) N-cyclohexyl-2-benzothiazyl sulfenamide (from Flexsys: "Santocure" CBS).

TABLE 3

| | Composition No. | | |
|---|---|---|---|
| | C-1 | C-2 | C-3 |
| Properties before curing: | | | |
| Mooney | 81 | 95 | 93 |
| T5 (min) | 27 | 20 | 28 |
| BR (%) | 43 | 39 | 38 |
| $t_i$ (min) | 12.7 | 10.2 | 12.5 |
| $t_{90}$ (min) | 25.6 | 22.1 | 22.7 |
| $t_{90} - t_i$ (min) | 12.9 | 11.9 | 10.2 |
| K (min⁻¹) | 0.18 | 0.19 | 0.22 |
| Properties after curing: | | | |
| Shore hardness | 60.8 | 61.2 | 60.3 |
| ME10 (MPa) | 4.29 | 4.00 | 3.91 |
| ME100 (MPa) | 1.54 | 1.85 | 1.64 |
| ME300 (MPa) | 1.97 | 2.85 | 2.30 |
| ME300/ME100 | 1.28 | 1.54 | 1.41 |
| $\Delta G^*$ (40° C.) | 1.87 | 1.92 | 1.74 |
| $\tan(\delta)_{max}$ (40° C.) | 0.204 | 0.196 | 0.203 |
| breaking stress (MPa) | 22.6 | 20.7 | 20.1 |
| elongation at break (%) | 600 | 470 | 540 |

TABLE 4

| Properties (in relative units) | P-1 | P-2 |
|---|---|---|
| Rolling resistance: | 100 | 100.5 |
| Wear resistance: | 100 | 100 |
| Drift thrust: | 100 | 104 |
| Braking on dry ground: | 100 | 100 |
| Braking on damp ground: | 100 | 104 |
| Performance on damp circuit comprising bends: | | |
| lap time: | 100 | 101 |
| behaviour mark: | 100 | 108 |

(a value greater than 100 indicates a performance which is improved compared with the control - base 100)

TABLE 5

| | Composition No. | |
|---|---|---|
| | C-4 | C-5 |
| NR (1) | 55 | 55 |
| BR (2) | 45 | 45 |
| silica A | 65 | — |
| silica B | — | 85 |
| carbon black (3) | 6 | 6 |
| aromatic oil (4) | 30 | 30 |
| paraffin oil (6) | 15 | 15 |
| TESPT (5) | 5.2 | 3.8 |
| DPG (7) | 1.2 | 0.9 |
| ZnO (8) | 2.5 | 2.5 |
| stearic acid | 2 | 2 |
| paraffin (9) | 1.5 | 1.5 |
| antioxidant (10) | 2.0 | 2.0 |
| sulfur | 1.1 | 1.1 |
| accelerator (11) | 2.0 | 2.0 |

(5) natural rubber;
(3) carbon black N330;
(6) "Flexon 815" from Shell;
(other references: idem Table 1)

TABLE 6

| | Composition No. | |
|---|---|---|
| | C-4 | C-5 |
| Properties before curing: | | |
| Mooney (MU) | 50 | 50 |
| T5 (min) | 20 | 24 |
| Properties after curing: | | |
| Shore hardness | 56.7 | 54.6 |
| ME10 (MPa) | 3.79 | 2.83 |
| ME100 (MPa) | 1.20 | 1.23 |
| ME300 (MPa) | 1.04 | 1.24 |
| ME300/ME100 | 0.87 | 1.01 |
| ΔG* (0° C.) | 2.38 | 1.42 |
| tan(δ)$_{max}$ (0° C.) | 0.26 | 0.17 |
| breaking stress (MPa) | 19.7 | 15.9 |
| elongation at break (%) | 770 | 640 |

TABLE 7

| Properties (in relative units) | P-4 | P-5 |
|---|---|---|
| Rolling resistance: | 100 | 106 |
| Braking on damp ground: | 100 | 105 |
| Braking on ice: | 100 | 102 |

(a value greater than 100 indicates a performance which is improved compared with the control - base 100)

The invention claimed is:

1. A tire comprising a tread incorporating an elastomeric composition reinforced with an inorganic filler, said composition comprising:
   (i) a diene elastomer;
   (ii) as reinforcing inorganic filler, more than 80 phr of a silica having the following features:
      (a) a BET specific surface area within a range from 60 to 90 m$^2$/g;
      (b) an average particle size d$_w$ within a range from 150 to 250 nm;
   (iii) a coupling agent; and
   (iv) a vulcanization system based on sulfur,
   wherein the diene elastomer comprises at least 50 phr of a butadiene elastomer selected from the group consisting of polybutadienes, styrene-butadiene copolymers and mixtures of these elastomers, and
   wherein the coupling agent is a polysulfurised silane, and the amount of the polysulfurised silane is within a range from 3 to 4.5 phr.

2. The tire according to claim 1, wherein the amount of reinforcing inorganic filler is greater than 90 phr.

3. The tire according to claim 2, wherein the amount of reinforcing inorganic filler is between 90 and 150 phr.

4. The tire according to claim 1, wherein the silica represents at least 50% by weight of the reinforcing inorganic filler.

5. The tire according to claim 4, wherein the silica represents more than 80% by weight of the reinforcing inorganic filler.

6. The tire according to claim 5, wherein the entire reinforcing inorganic filler consists of the silica.

7. The tire according to claim 1, wherein the composition further comprises carbon black.

8. The tire according to claim 7, wherein the amount of carbon black is between 2 and 20 phr.

9. The tire according to claim 1, wherein the silica further has the following feature:
a disagglomeration rate α greater than 5×10$^{-3}$ μm$^{-1}$/min.

10. The tire according to claim 9, wherein the silica has the following feature:
a disagglomeration rate α at least equal to 1×10$^{-2}$ μm$^{-1}$/min.

11. The tire according to claim 1, wherein the vulcanization system further comprises a sulfenamide primary accelerator, the overall amount of sulfur and sulfenamide accelerator being within a range from 1.25 to 2.75 phr.

12. The tire according to claim 11, wherein the vulcanization system further comprises diphenylguanidine, the overall amount of sulfur, sulfenamide and diphenylguanidine being within a range from 1.75 to 4.25 phr.

13. The tire according to claim 1, wherein the vulcanization system further comprises, as vulcanization activator, between 0.5 and 1.5 phr of zinc.

14. The tire according to claim 13, wherein zinc is supplied in the form of zinc oxide.

15. The tire according to claim 13, wherein zinc is supplied in the presence of a fatty acid.

16. The tire according to claim 15, wherein the fatty acid is stearic acid.

17. The tire according to claim 16, wherein the amount of stearic acid is of 0.5 to 3 phr.

18. The tire according to claim 13, wherein the amount of zinc is within a range from 0.7 to 1.3 phr.

* * * * *